Patented Mar. 23, 1943

2,314,804

UNITED STATES PATENT OFFICE 2,314,804

GLASS ARTICLE

Herbert S. Willson, Corning, N. Y., assignor to Corning Glass Works, Corning, N. Y., a corporation of New York No Drawing. Application December 7, 1938, Serial No. 244,474

5 Claims. (Cl. 49—92)

This invention relates to glass and more particularly to objects of art made therefrom wherein an article is formed of two layers of different colored glass and a design is formed by removal of selected portions of one layer to expose the other layer. Heretofore it has been necessary to form such articles by double gathering, that is, by flashing or casing one glass with another, and, oftentimes, entirely different glass. The articles were thus limited for the most part to hollow ware or blown articles. Much difficulty was experienced in annealing, because different glasses have different annealing characteristics and permanent strain might remain after annealing even though the expansion coefficients were substantially alike. If the expansion coefficients were not substantially alike, residual permanent strain was unescapable and it is difficult to maintain the proper match between expansion coefficients in a series of melts. Obviously, if a substantial amount of strain remained in the articles, breakage was very likely to occur when the outer layer was cut through even though the strain was uniformly distributed.

The object of this invention is to produce from a single glass an article having a varicolored design without the addition of extraneous materials into the glass or on its surface.

The above and other objects may be accomplished by practicing my invention, which comprises among its features melting a glass containing a substantial amount of an oxide of an easily reducible metal of the group consisting of lead and copper, fabricating the article therefrom, reheating the article under reducing conditions to reduce the said oxide in the surface layer of the glass, and thereafter removing selected areas of the surface layer to expose the unreduced interior portion of the glass.

Another feature comprises a glass article composed throughout of a glass containing a substantial amount of an oxide of an easily reducible metal of the group consisting of lead and copper, selected portions of the surface layer of the glass having a color different than the interior portion and consisting of the same glass forming constituents as the interior portion but containing a substantial amount of the said metal oxide in a lower state of oxidation.

In the practice of my invention the article is fabricated in the usual manner by molding, pressing or blowing it from a glass containing lead or copper, after which the article is heated in a reducing atmosphere such as an atmosphere of hydrogen or methane for a time and at a temperature which will cause reduction of some of the lead or copper in the surface layer of the glass. Such reduction results in the coloration of the surface layer of the glass, the color being black in the case of lead containing glass and a red or brown hue in the case of a copper containing glass. The development of such a colored surface layer is no doubt due to a reduction of some of the lead or copper oxides in the glass. It is not a superficial metallized layer because it is not electrically conducting. The reduction occurs within the glass. The reduced atoms or molecules apparently are substantially unmoved from their original location in the molecular structure and hence are individually surrounded by the other atoms of the glass.

After a colored surface layer has thus been formed on the surface of the article, a design is produced thereon by removing selected portions of the colored surface layer, as by cutting or engraving with a cutting wheel or by means of acid etching or sand blasting, etc. By thus cutting through the colored surface layer of the article, the unreduced interior portion of the glass is exposed and the remaining portions of the colored surface layer are in relief. The design may be reversed and the reduced surface layer may be left in intaglio by initially molding the article so as to impress the design in the surface thereof. After the article has been heat treated reducingly as above described, the portions of the surface layer which are in relief are ground and polished off and the remaining portions of the reduced surface layer will remain in intaglio.

Instead of removing portions of the reduced surface layer as above, the design may be formed by preventing reduction of the desired areas. This is best done by the application of a suitable resist to those areas before the reduction step. A resist which I have found to be suitable for the purpose comprises powdered metallic zinc mixed to a paste with any suitable binder, such as fat oil of turpentine which is a viscous slow drying oil derived from turpentine. Compounds of zinc, such as the oxide which may be reduced to the metal, may be used in lieu of metallic zinc. Other ingredients, such as ochre, may be added, if desired, to improve the quality of the paste and assist the binding effect. The resist is applied uniformly to those portions of the surface of the article which it is desired to protect against reduction and the article is heat treated reducingly as above, after which the resist may be removed by buffing with steel wool, the design thereupon being revealed by the contrast between the reduced and the unreduced portions of the surface of the article.

With hollow articles the protection against reduction of the interior surface of the article may be accomplished by sealing the interior of the article from the reducing atmosphere. Such a seal may comprise closing the open end of the article by fusing it together in the usual manner or by placing the open end just below the surface of a fluid sealing medium, such as molten zinc or a molten salt or mixture of salts within the reducing furnace. The portion of the article which was distorted or damaged by the seal is thereafter removed by any suitable means.

If the glass which is employed in the above process is normally colored, the areas of the surface layer which are not reduced will form a contrast or a harmonizing effect with the reduced portions of the surface layer and many beautiful artistic effects may thus be produced. Through the use of glasses which are normally opal or which become opal during the heat treatment, a higher degree of contrast between the reduced and the unreduced areas of the design may be obtained. In general borosilicate glasses, that is, glasses which contain at least 5% of boric oxide, produce better color on reduction than non-borosilicates. The presence of fluorine brightens the colors. The following compositions, expressed in weight percent as calculated from the respective batches, will illustrate some glasses that are particularly suitable for my purpose.

|  | I | II | III | IV | V | VI | VII | VIII |
|---|---|---|---|---|---|---|---|---|
| $SiO_2$ | 73.7 | 73 | 71 | 34 | 72 | 73.2 | 66 | 59 |
| $Na_2O$ | 7.8 | 5 | 5 |  | 8 | 9.7 | 16 | 11.6 |
| $K_2O$ | 2 |  |  | 6 |  |  |  |  |
| $PbO$ | 2.9 |  |  | 59 |  |  |  | 22.2 |
| $B_2O_3$ | 8.7 | 16 | 16 |  | 18 | 11.6 |  |  |
| $Al_2O_3$ | 2 |  | 2 |  |  |  |  | 1 |
| $CuO$ |  |  |  |  | 2 | 2 | 2 | 3 |
| $CaO$ |  |  |  |  |  |  | 9.4 |  |
| $As_2O_3$ |  |  |  |  |  |  | 1 |  |
| $Sb_2O_3$ |  |  |  | 1 |  |  |  |  |
| $F$ | 2.9 |  |  |  |  | 3.5 | 5.6 | 3.2 |

Referring to the above compositions, the following is to be noted:

Glasses I to IV are examples of lead glasses which may be employed in the practice of my invention and of which I is a fluoride opal lead borosilicate; II is a lead borosilicate which becomes a pale opal throughout during the heat treatment; III is a lead borosilicate which remains clear during heat treatment; and IV is a simple potash lead glass. Glasses I to IV develop a black surface layer when heat treated reducingly in an atmosphere of hydrogen or methane.

Glasses V to VIII are examples of copper containing glasses which are suitable for the practice of my invention and of which V is a simple borosilicate; VI is a borosilicate containing fluorine; VII is a soda-lime glass containing fluorine and a small amount of arsenic; and VIII is a lead glass containing fluorine. When these glasses are heat treated reducingly in an atmosphere of hydrogen or methane they develop a surface layer which is colored with a red or brownish hue.

In developing a colored surface layer on the above glasses by heat treating them reducingly, it is preferable to use temperatures near the softening temperature of the respective glass, because the facility of coloration is practically inversely proportional to the viscosity of the glass. The maximum temperature which is suitable for a particular glass is limited by the softening temperature of the glass or the temperature at which the article will soften sufficiently to become deformed. The length of time required will depend upon the reducing power of the atmosphere employed, hydrogen being the most powerful, and also upon the density of coloration desired, stronger coloration being obtained as the time is increased. Obviously, as the temperature is decreased, a longer time will be required for a given color density. The most suitable conditions may readily be determined by trial.

I claim:

1. A glass article composed throughout of a borosilicate glass containing a substantial amount of an oxide of an easily reducible metal selected from the group consisting of lead and copper, selected portions of the surface layer of the glass having a different color than the interior portion of the glass, said selected portions being formed from the same glass forming constituents as the interior portion but having a substantial amount of the said metal oxide reduced to the metallic state.

2. A glass article composed throughout of a borosilicate glass containing a substantial amount of lead oxide having a design comprising an area which is black and which consists of a thin surface layer of the glass in which at least a portion of the lead oxide has been reduced to lead.

3. A glass article composed throughout of a borosilicate glass containing a substantial amount of copper oxide having a design comprising an area which has a different color than the interior of the glass and which consists of a thin surface layer in which at least a portion of the copper oxide has been reduced to copper.

4. A glass article, composed throughout of a borosilicate glass containing a substantial amount of fluorine and lead oxide, having a design comprising an area which is black and which consists of a thin surface layer of the glass in which at least a portion of the lead oxide has been reduced to metallic lead.

5. A glass article, composed throughout of a borosilicate glass containing a substantial amount of fluorine and copper oxide, having a design comprising an area which has a different color than the interior of the glass and which consists of a thin surface layer in which at least a portion of the copper oxide has been reduced to metallic copper.

HERBERT S. WILLSON.